(12) United States Patent
Thomas et al.

(10) Patent No.: US 10,191,875 B2
(45) Date of Patent: Jan. 29, 2019

(54) TECHNIQUES OF PROVIDING SERIAL PORT IN NON-LEGACY SYSTEM VIA EMBEDDED-SYSTEM DEVICE

(71) Applicant: American Megatrends, Inc., Norcross, GA (US)

(72) Inventors: Satheesh Thomas, Dunwoody, GA (US); Baskar Parthiban, Johns Creek, GA (US); Revanth Sreenivasan A, Chennai (IN); Aruna Venkataraman, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 0 days.

(21) Appl. No.: 15/590,585

(22) Filed: May 9, 2017

(65) Prior Publication Data

US 2018/0329843 A1    Nov. 15, 2018

(51) Int. Cl.
| | |
|---|---|
| *G06F 13/38* | (2006.01) |
| *H04L 29/06* | (2006.01) |
| *G06F 15/82* | (2006.01) |
| *G06F 15/76* | (2006.01) |
| *G06F 21/85* | (2013.01) |

(52) U.S. Cl.
CPC .......... *G06F 13/385* (2013.01); *G06F 15/825* (2013.01); *H04L 29/06265* (2013.01); *G06F 21/85* (2013.01); *G06F 2015/766* (2013.01); *G06F 2015/768* (2013.01)

(58) Field of Classification Search
USPC ............................. 710/2, 5, 8, 10, 12, 16, 14
See application file for complete search history.

(56) References Cited

U.S. PATENT DOCUMENTS

| | | | |
|---|---|---|---|
| 7,484,084 B1* | 1/2009 | Ranaweera | G06F 8/656 713/1 |
| 2004/0268013 A1* | 12/2004 | Pagan | G06F 13/4027 710/313 |
| 2007/0204332 A1* | 8/2007 | Pan | G06F 21/31 726/5 |
| 2012/0144180 A1* | 6/2012 | Tang | G06F 9/50 713/2 |
| 2013/0326278 A1* | 12/2013 | Yin | G06F 11/362 714/38.1 |
| 2014/0101653 A1* | 4/2014 | Dharmadhikari | G06F 8/65 717/173 |
| 2014/0115112 A1* | 4/2014 | Wang | H04L 49/90 709/219 |

* cited by examiner

*Primary Examiner* — Raymond N Phan
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be an embedded-system device. The embedded-system device receives first command or data through a first serial port of the embedded-system device. The embedded-system device further exposes a second serial port to a host of the embedded-system device such that the host has control over the second serial port and receiving second command or data from the host for outputting at the second serial port. The embedded-system device also redirects the first command or data to the second serial port when the embedded-system device is in a first mode. The embedded-system device allows the second command or data to be output at the second serial port when the embedded-system device is in a second mode.

17 Claims, 4 Drawing Sheets

TECHNIQUES OF PROVIDING SERIAL PORT IN NON-LEGACY SYSTEM VIA EMBEDDED-SYSTEM DEVICE

BACKGROUND

Field

The present disclosure relates generally to embedded-system devices, and more particularly, to techniques of accessing serial console of controllers of a host system via a baseboard management controller (BMC) of the host system.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc. A BMC may be considered as an embedded-system device.

A host system may have a number of controllers. Each of the controllers runs its own firmware. The serial console (e.g., a debug console) of a controller of the host system is useful after the host system is deployed. Often after the host system is deployed, the serial header (e.g., a debug header) is not maintained at the controller, which is integrated into the host system. Therefore, there is a need to access the serial console of the controller after the host is deployed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an embedded-system device. The embedded-system device receives first command or data through a first serial port of the embedded-system device. The embedded-system device further exposes a second serial port to a host of the embedded-system device such that the host has control over the second serial port and receiving second command or data from the host for outputting at the second serial port. The embedded-system device also redirects the first command or data to the second serial port when the embedded-system device is in a first mode. The embedded-system device allows the second command or data to be output at the second serial port when the embedded-system device is in a second mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
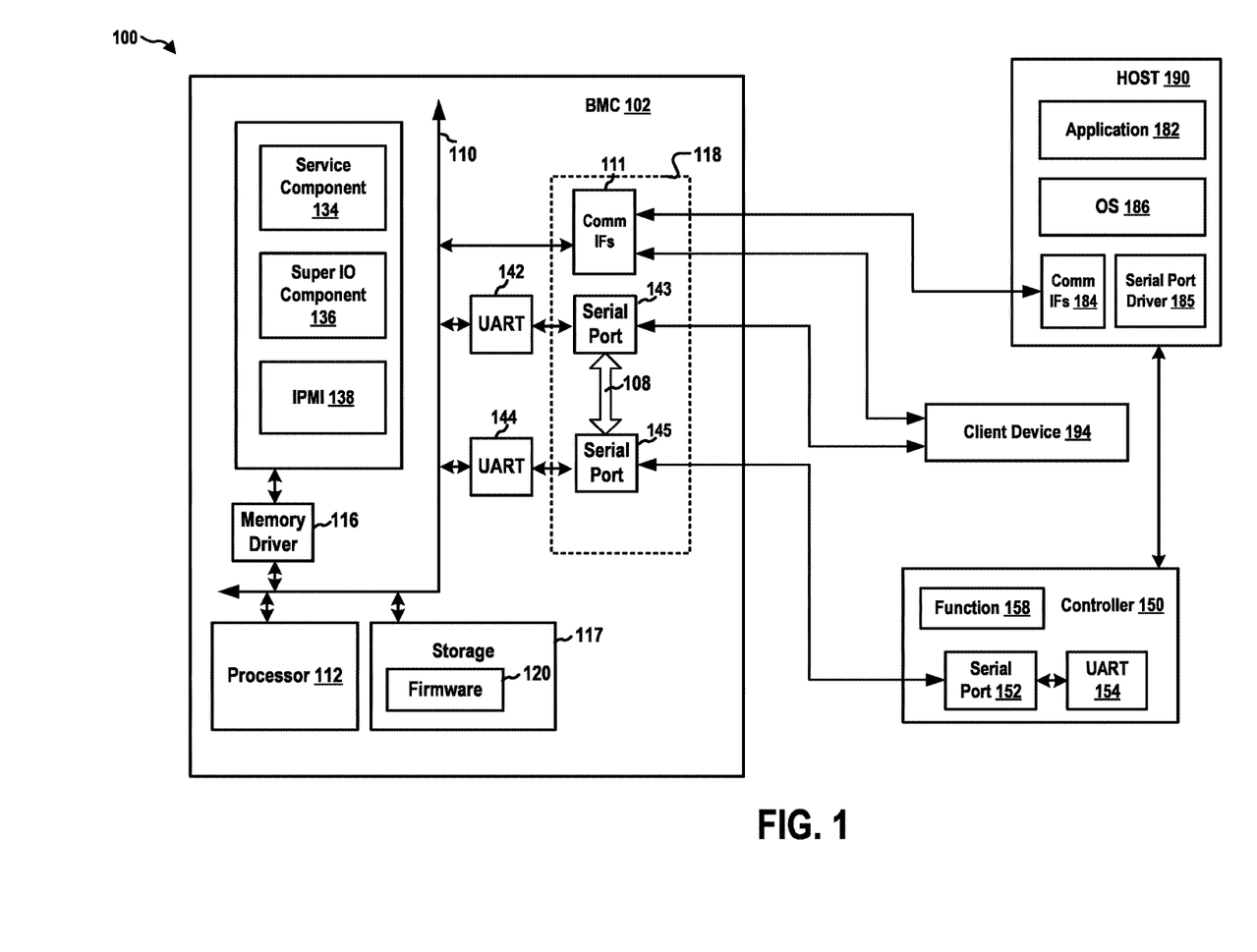
FIG. 1 is a diagram illustrating a computer system.

FIG. 1 is a diagram 100 illustrating a computer system. The computer system includes a BMC 102, a host computer 190, and a controller 150. The BMC 102 has a processor 112, a memory 114, a memory driver 116, a storage 117, a serial port controller 142 controlling a serial port 143, a serial port controller 144 controlling a serial port 145, and communication interfaces 111. The serial ports 143, 145 and other serial ports described infra may be COM ports supporting "TIA-232-F Interface Between Data Terminal Equipment and Data Circuit-Terminating Equipment Employing Serial Binary Data Interchange" (RS-232) standard, issued in 1997, which is incorporated herein by reference in its entirety. In certain configurations, one or more of the above components may be implemented as a system-on-a-chip (SoC). For examples, the processor 112, the memory 114, the storage 117, the serial port controllers 142, 144, and the serial ports 143, 145 may be on the same chip. The memory 114, the processor 112, the memory driver 116, the storage 117, the serial port controller 142, the serial port controller 144, and/or the communication interfaces 111 may be in communication with each other through a communication channel 110 such as a bus architecture. The serial port controllers 142, 144 and other serial port controllers described infra may be universal asynchronous receiver/transmitter (UART) devices.

The BMC 102 may store BMC firmware 120 in the storage 117. When the processor 112 executes the BMC firmware 120, the processor 112 loads code and data of the BMC firmware 120 into the memory 114. This example shows that the BMC firmware 120 provides in the memory 114, among other components, a service component 134, a super IO component 136, and an IPMI service 138.

The IPMI service 138 supports IPMI and provides an IPMI interface 118. The IPMI interface 118 may be implemented over the serial port 143, the serial port 145, and/or the communication interfaces 111. The communication interfaces 111 may include a keyboard controller style (KCS), a server management interface chip (SMIC), a block transfer (BT) interface, a system management bus system interface (SSIF), a Universal Serial Bus (USB) interface, a PCI/PCIe interface, a network interface (e.g., LAN/Wireless LAN interface), and/or other suitable communication interface(s). The IPMI service 138 may receive and send IPMI messages through the IPMI interface 118.

The BMC 102 may be in communication with the host computer 190 through the communication interfaces 111 and/or the IPMI interface 118. The BMC 102 may manage the host computer 190. The host computer 190 includes, among other components, a host OS 186, a console application 182, a serial port driver 185, and host communication interfaces 184.

Through the communication interfaces 111 and the host communication interfaces 184 (e.g., a USB interface or a Peripheral Component Interconnect/Peripheral Component Interconnect Express (PCI/PCIe) interface), the super IO component 136 may register the BMC 102 with the host computer 190 to function as a super IO controller that includes the serial port controller 142 controlling the serial port 143. In other words, the host computer 190 perceives that a super IO controller is connected to the host computer 190 through the host communication interfaces 184. Accordingly, the host computer 190 may control the serial port controller 142 to output serial signals through the serial port 143. For example, the signals may be in compliance with the RS-232 standards. In one example, the console application 182 may be configured to output commands and/or data at a serial port of the host computer 190. The host OS 186 perceives the serial port controller 142 and the serial port 143 as a serial port controller and a serial port of the host computer 190 and makes the serial port controller 142 and the serial port 143 available to the console application 182. Accordingly, the console application 182 can use the serial port driver 185 to drive the serial port controller 142 to output serial signals at the serial port 143.

In addition, the controller 150 is in communication with the host computer 190 and provides one or more functions to the host computer 190. For example, the controller 150 may be a special purpose controller such as a power controller. The controller 150 includes, among other components, a serial port 152 and a serial port controller 154 that generates serial signals to be output at the serial port 152. The serial port 152 is in communication with the serial port 145 of the BMC 102. As such, a function 158 (e.g., a debug function) of the controller 150 may send commands and/or data to the serial port controller 154, which correspondingly generate serial signals and output the signals at the serial port 152.

The BMC 102 may be configured to operate in a first mode or a second mode. As described supra, the controller 150 may send serial signals to the serial port 145 of the BMC 102. When the BMC 102 is operating in the first mode, the serial port controller 144 receives the serial signals of the controller 150 from the serial port 145. In a first configuration, the service component 134 of the BMC 102 is configured to redirect the serial signals received from the serial port 145 to the serial port 143 for outputting. In particular, the serial port controller 144 processes the serial signals and generates corresponding commands and/or data. The service component 134 obtains the commands and/or data from the serial port controller 144. Subsequently, the service component 134 sends the commands and/or data to the serial port controller 142. The serial port controller 142 generates corresponding serial signals and outputs the serial signals at the serial port 143. As one example, the function 158 of the controller 150 may be a debug function. The debug function may output debug data/signals through the serial port 152. In this example, the debug data/signals are received at the serial port 145. As described supra, the service component 134 redirects the debug data/signals received from the serial port 145 to the serial port 143. As such, a computing device 194 may connect to the serial port 143 to receive the debug data/signals generated by the controller 150. The computing device 194 may also display the received debug data/signals on a display.

When the BMC 102 operates in the first mode, in a second configuration, the chip implementing the BMC 102 may be configured to establish a chip communication channel 108 between the serial port 145 and the serial port 143. All signals received at the serial port 145 will be routed to the serial port 145 without being processed by the serial port controller 144, the serial port controller 142, or components of the BMC firmware 120 such as the service component 134. In this second configuration, the service component 134 may configure the chip (e.g., set a value of a particular register to a particular value) to open the chip communication channel 108 in order to redirect the signals received at the serial port 145 to be output at the serial port 143. Accordingly, in the example described supra where the function 158 is a debug function, the debug data/signals output from the serial port 152 of the controller 150 is received at the serial port 145 and directly routed to the serial port 143 through the chip communication channel 108. As such, the computing device 194 connected to the serial port 143 can receive the debug data/signals of the controller 150.

As described supra, the BMC 102 may also function as a super IO controller to the host computer 190. As such, the super IO component 136 may receive, through the communication interfaces 111, commands and/or data sent from the host computer 190 and directed to the serial port controller 142. When the BMC 102 is operating in the first mode, as described supra, the serial port 143 is utilized to output redirected data/signals that were initially received at the serial port 145. In the first mode, the super IO component 136 does not forward the commands and/or data received from the host computer 190 to the serial port controller 142, which controls the serial port 143.

When the BMC 102 operates in the second mode, the serial port 143 is used and controlled by the host computer 190 as a super IO controller component, as described supra. That is, the host computer 190 perceives the BMC 102 as a super IO controller including the serial port 143. When the super IO component 136 receives the commands and/or data directed to the serial port controller 142 through the communication interfaces 111, the super IO component 136 forwards those commands and/or data to the serial port controller 142, which process the commands and/or data to generate corresponding serial signals to be output at the serial port 143. The service component 134, on the other hand, does not send the commands and/or data received from the serial port controller 144/serial port 145 to the serial port controller 142/serial port 143. Further, when the chip implementing the BMC 102 may establish the chip communication channel 108, the service component 134 configures the chip (e.g., through a register of the chip) to disconnect the chip communication channel 108 such that data/signals received at the serial port 145 will not be directly routed to the serial port 143.

In certain configurations, the service component 134 may receive a control message (or command) that instructs the BMC 102 to operate in the first mode or the second mode. For example, the host computer 190 or the computing device 194 may send the control message to the BMC 102 through one or more interfaces of the BMC 102 (e.g., the LAN interface). Further, the control message may be carried in an IPMI message received by the IPMI service 138. In particular, the IPMI message may be an IPMI Original Equipment Manufacturer (OEM) message. That is, a manufacturer specific IPMI message carries the control message at particular fields or bits. Upon receiving such an IPMI OEM message, the IPMI service 138 can extract the control message from the IPMI OEM message and then can send the control message to the service component 134. The service component 134 then sets the operation mode of the BMC 102 in accordance with the indication of the control message. As an example, the host computer 190 or the computing device 194 can send an IPMI OEM message carrying the control message to the BMC 102 through the IPMI interface 118.

Figure 2:
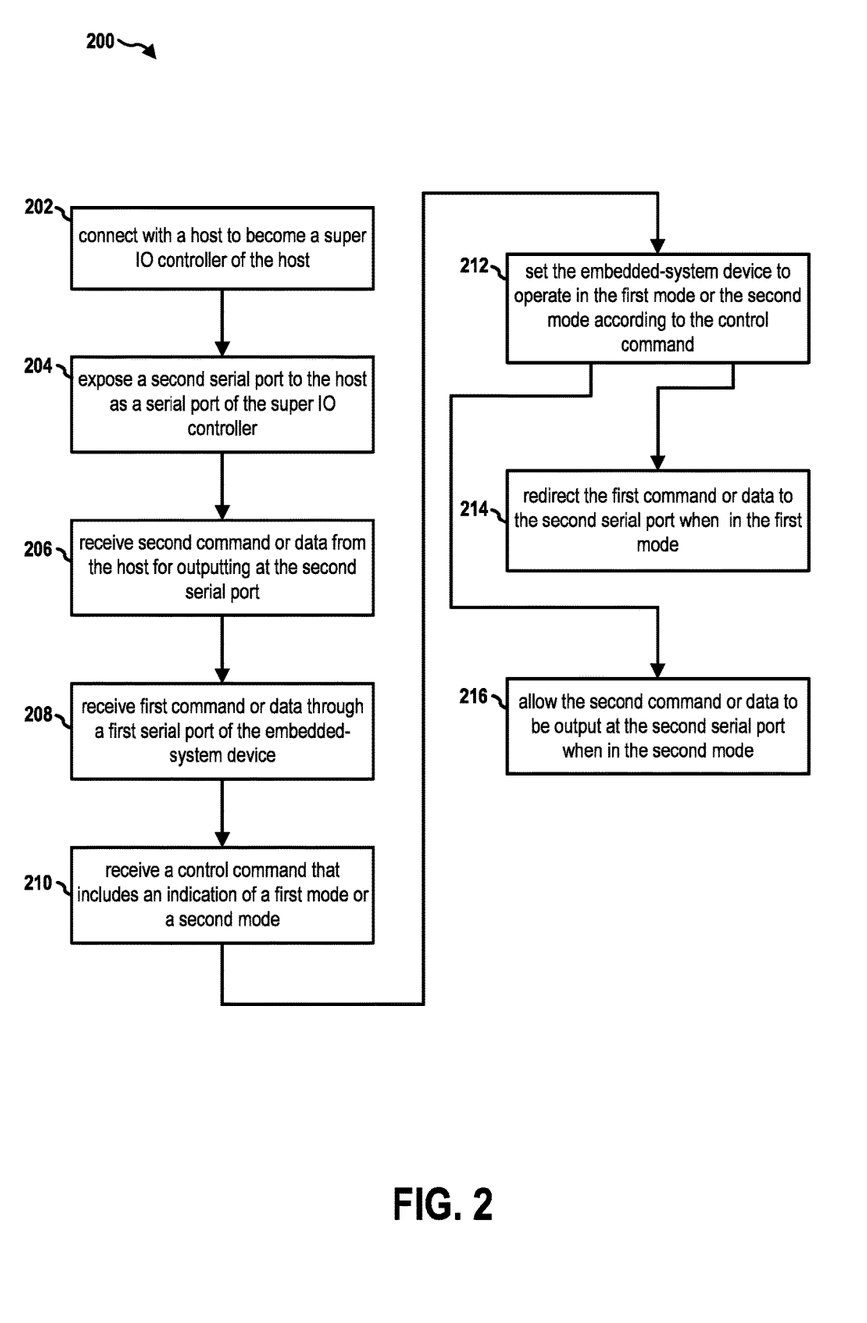
FIG. 2 is a flow chart of a method (process) for redirecting signals from a first serial port to a second serial port.

FIG. 2 is a flow chart 200 of a method (process) for redirecting signals from a first serial port to a second serial port. The method may be performed by an embedded-system device (e.g., the BMC 102 and the apparatus 102'). In certain configurations, at operation 202, the embedded-system device connects with a host (e.g., the host computer 190) of the embedded-system device to become a super IO controller of the host. At operation 204, the embedded-system device exposes a second serial port (e.g., the serial port 143) to the host such that the host has control over the second serial port. The second serial port may be exposed to the host as a serial port of the super IO controller.

At operation 206, the embedded-system device receives second command or data from the host for outputting at the second serial port. At operation 208, the embedded-system device receives first command or data through a first serial port of the embedded-system device. At operation 210, the embedded-system device receives a control command that includes an indication of a first mode or a second mode. In certain configurations, the control command in an IPMI command. At operation 212, the embedded-system device sets the embedded-system device to operate in the first mode or the second mode according to the control command.

At operation 214, the embedded-system device redirects the first command or data to the second serial port when the embedded-system device is in the first mode. In certain configurations, the embedded-system device receives first signals at the first serial port. the embedded-system device operates a first serial port controller to process the first signals to generate the first command or data. To redirect the first command or data in the first mode, the embedded-system device constructs third command or data based on the first command or data. The embedded-system device sends the third command or data to a second serial port controller. The second serial port controller generates second signals based on the third command or data. The second serial port controller sends the third command or data to the second serial port for outputting. The embedded-system device outputs the second signals at the second serial port. In certain configurations, in the first mode: the embedded-system device configures a chip of the embedded-system device to open a communication channel between the first serial port with the second serial port. The chip transfers, through the communication channel, the command or data received at the first serial port to the second serial port without being processed by firmware of the embedded-system device.

At operation 216, the embedded-system device allows the second command or data to be output at the second serial port when the embedded-system device is in the second mode.

Figure 3:
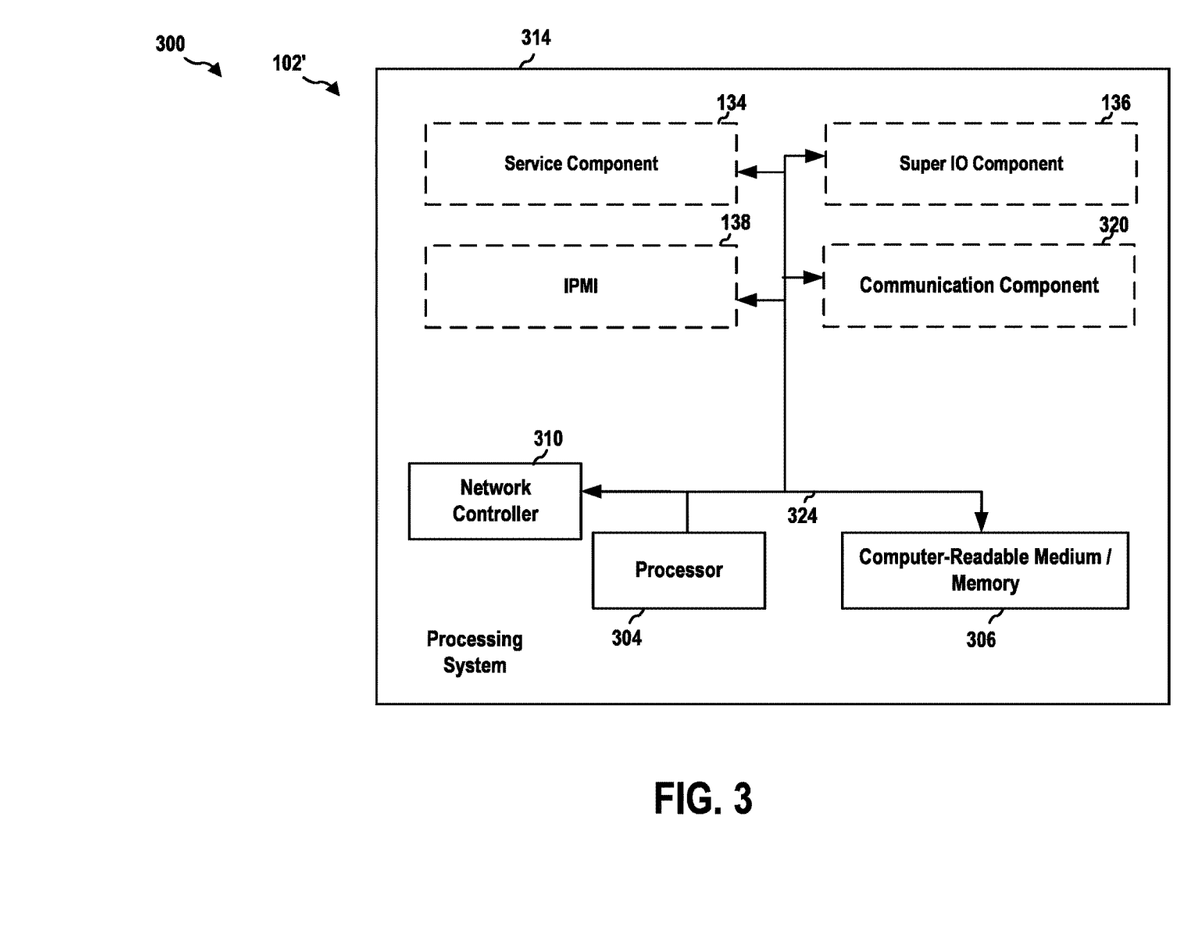
FIG. 3 is a diagram illustrating an example of a hardware implementation for an apparatus employing a processing system.

FIG. 3 is a diagram 300 illustrating an example of a hardware implementation for an apparatus 102' employing a processing system 314. The processing system 314 may be implemented with a bus architecture, represented generally by the bus 324. The bus 324 may include any number of interconnecting buses and bridges depending on the specific application of the processing system 314 and the overall design constraints. The bus 324 links together various circuits including one or more processors and/or hardware components, represented by, among other components, the processor 304, the computer-readable medium/memory 306, and the network controller 310. In particular, the computer-readable medium/memory 306 may include the memory 114 and the storage 117. The bus 324 may also link various other circuits such as timing sources, peripherals, voltage regulators, and power management circuits, which are well known in the art, and therefore, will not be described any further.

The processing system 314 may be coupled to a network controller 310. The network controller 310 provides a means for communicating with various other apparatus over a network. The network controller 310 receives a signal from the network, extracts information from the received signal, and provides the extracted information to the processing system 314, specifically a communication component 320 of the apparatus 102'. In addition, the network controller 310 receives information from the processing system 314, specifically the communication component 320, and based on the received information, generates a signal to be sent to the network. The processing system 314 includes a processor 304 coupled to a computer-readable medium/memory 306. The processor 304 is responsible for general processing, including the execution of software stored on the computer-readable medium/memory 306. The software, when executed by the processor 304, causes the processing system 314 to perform the various functions described supra for any particular apparatus. The computer-readable medium/memory 306 may also be used for storing data that is manipulated by the processor 304 when executing software. The processing system further includes at least one of the service component 134, the super 10 component 136, the IPMI service 138. The components may be software components running in the processor 304, resident/stored in the computer readable medium/memory 306, one or more hardware components coupled to the processor 304, or some combination thereof The apparatus 102' may be configured to include means for performing each of the operations described supra referring to FIG. 2. The aforementioned means may be one or more of the aforementioned components of the apparatus 102' and/or the processing system 314 of the apparatus 102' configured to perform the functions recited by the aforementioned means.

Figure 4:
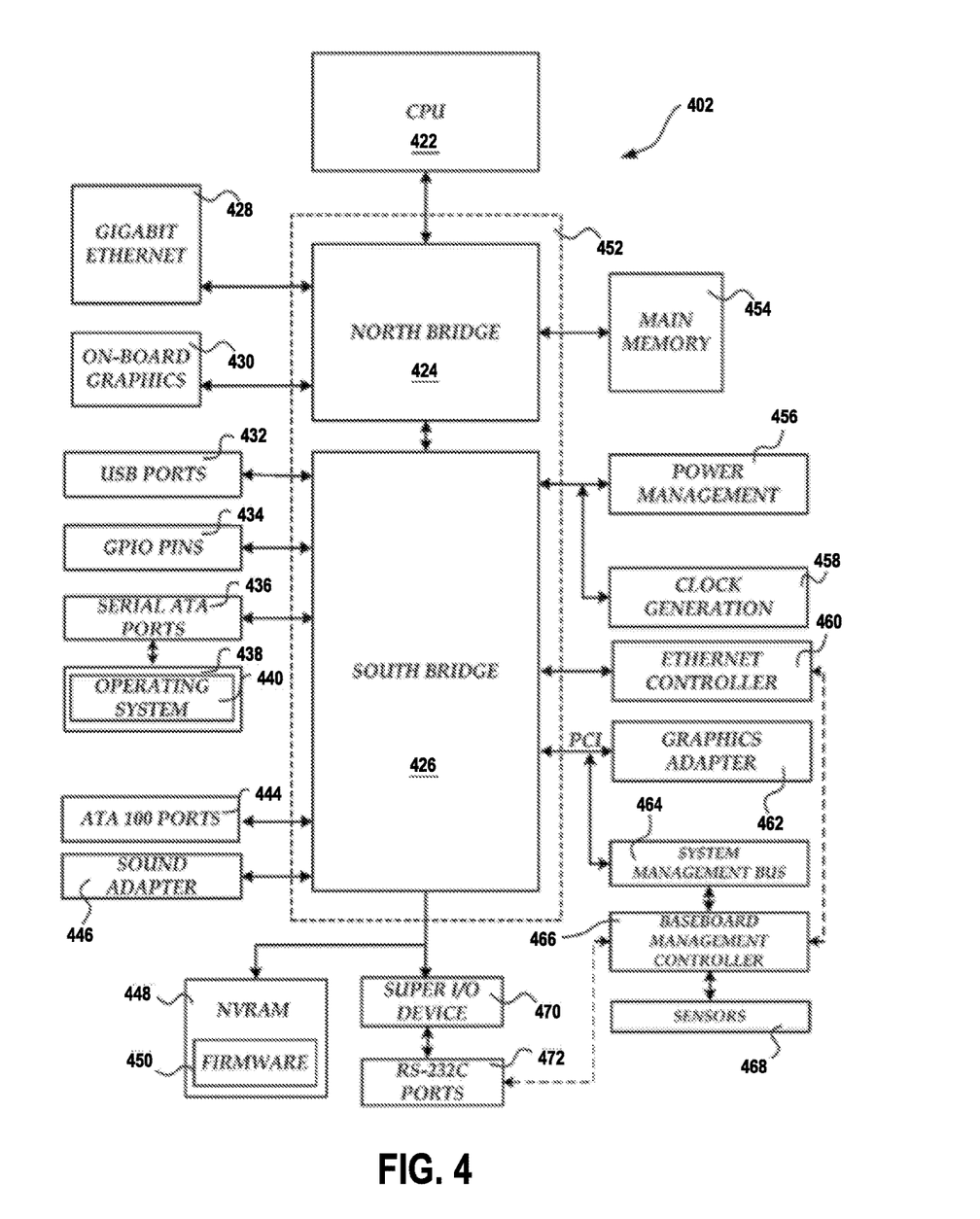
FIG. 4 shows a computer architecture for a computer.

FIG. 4 and the following discussion are intended to provide a brief, general description of one suitable computing environment in which aspects of the embodiments described herein may be implemented. In particular, FIG. 4 shows a computer architecture for a computer 402 that may be utilized to embody the host computer 190, as described supra. It should be appreciated that the computer architecture shown in FIG. 4 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 402 shown in FIG. 4 includes a baseboard, or "motherboard," which is a printed circuit board to which a multitude of components or devices may be connected by way of a system bus or other electrical communication path. In one illustrative embodiment, a CPU 422 operates in conjunction with a chipset 452. The CPU 422 is a standard central processor that performs arithmetic and logical operations necessary for the operation of the computer. The server computer 402 may include a multitude of CPUs 422.

The chipset 452 includes a north bridge 424 and a south bridge 426. The north bridge 424 provides an interface between the CPU 422 and the remainder of the computer 402. The north bridge 424 also provides an interface to a random access memory ("RAM") used as the main memory 454 in the computer 402 and, possibly, to an on-board graphics adapter 430. The north bridge 424 may also include functionality for providing networking functionality through a gigabit Ethernet adapter 428. The gigabit Ethernet adapter 428 is capable of connecting the computer 402 to another computer via a network. Connections which may be made by the network adapter 428 may include LAN or WAN connections. LAN and WAN networking environments are commonplace in offices, enterprise-wide computer networks, intranets, and the internet. The north bridge 424 is connected to the south bridge 426.

The south bridge 426 is responsible for controlling many of the input/output functions of the computer 402. In particular, the south bridge 426 may provide one or more USB ports 432, a sound adapter 446, an Ethernet controller 460, and one or more GPIO pins 434. The south bridge 426 may also provide a bus for interfacing peripheral card devices such as a graphics adapter 462. In one embodiment, the bus comprises a PCI bus. The south bridge 426 may also provide a system management bus 464 for use in managing the various components of the computer 402. Additional details regarding the operation of the system management bus 464 and its connected components are provided below.

The south bridge 426 is also operative to provide one or more interfaces for connecting mass storage devices to the computer 402. For instance, according to an embodiment, the south bridge 426 includes a serial advanced technology attachment ("SATA") adapter for providing one or more SATA ports 436 and an ATA 100 adapter for providing one or more ATA 100 ports 444. The SATA ports 436 and the ATA 100 ports 444 may be, in turn, connected to one or more mass storage devices such as the SATA disk drive 438 storing an operating system 440 and application programs.

As known to those skilled in the art, an operating system 440 comprises a set of programs that control operations of a computer and allocation of resources. An application program is software that runs on top of the operating system software, or other runtime environment, and uses computer resources to perform application specific tasks desired by the user. According to one embodiment of the invention, the operating system 440 comprises the LINUX operating system. According to another embodiment of the invention the operating system 440 comprises an operating system within the WINDOWS family of operating systems from MICROSOFT CORPORATION. According to another embodiment, the operating system 440 comprises the UNIX, LINUX, or SOLARIS operating system. It should be appreciated that other operating systems may also be utilized.

The mass storage devices connected to the south bridge 426, and their associated computer storage media, provide non-volatile storage for the computer 402. Although the description of computer storage media contained herein refers to a mass storage device, such as a hard disk or CD-ROM drive, it should be appreciated by those skilled in the art that computer storage media can be any available media that can be accessed by the computer 402.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that help to start up the computer 402 and to transfer information between elements within the computer 402.

As described briefly above, the south bridge 426 may include a system management bus 464. The system management bus 464 may include a BMC 466. The BMC 466 may be the BMC 102. In general, the BMC 466 is a microcontroller that monitors operation of the computer system 402. In a more specific embodiment, the BMC 466 monitors health-related aspects associated with the computer system 402, such as, but not limited to, the temperature of one or more components of the computer system 402, speed of rotational components (e.g., spindle motor, CPU Fan, etc.) within the system, the voltage across or applied to one or more components within the system 402, and the available or used capacity of memory devices within the system 402. To accomplish these monitoring functions, the BMC 466 is communicatively connected to one or more components by way of the management bus 464. In an embodiment, these components include sensor devices 468 for measuring various operating and performance-related parameters within the computer system 402. The sensor devices 468 may be either hardware or software based components configured or programmed to measure or detect one or more of the various operating and performance-related parameters.

It should also be appreciated that the computer 402 may comprise other types of computing devices, including handheld computers, embedded computer systems, personal digital assistants, and other types of computing devices known to those skilled in the art. It is also contemplated that the computer 402 may not include all of the components shown in FIG. 4, may include other components that are not explicitly shown in FIG. 4, or may utilize an architecture completely different than that shown in FIG. 4.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating an embedded-system device, comprising:

receiving first command or data through a first serial port of the embedded-system device;

exposing a second serial port to a host of the embedded-system device such that the host has control over the second serial port and receiving second command or data from the host for outputting at the second serial port;

redirecting the first command or data to the second serial port when the embedded-system device is in a first mode; and allowing the second command or data to be output at the second serial port when the embedded-system device is in a second mode;

wherein the redirecting the first command or data includes, in the first mode:

constructing third command or data based on the first command or data; and sending the third command or data to the second serial port for outputting.

2. The method of claim 1, further comprising:

connecting with the host to become a super IO controller of the host, wherein the second serial port is exposed to the host as a serial port of the super IO controller.

3. The method of claim 1, further comprising, in the first mode:

configuring a chip of the embedded-system device to open a communication channel between the first serial port with the second serial port, wherein the chip transfers, through the communication channel, the first command or data received at the first serial port to the second serial port without being processed by firmware of the embedded-system device.

4. The method of claim 1, further comprising:

receiving a control command that includes an indication of the first mode or the second mode; and setting the embedded-system device to operate in the first mode or the second mode according to the control command.

5. The method of claim 1, further comprising:

receiving first signals at the first serial port;

operating a first serial port controller to process the first signals to generate the first command or data;

sending the third command or data to a second serial port controller;

generating, at the second serial port controller, second signals based on the third command or data; and outputting the second signals at the second serial port.

6. The method of claim 4, wherein the control command in an Intelligent Platform Management Interface (IPMI) command.

7. An apparatus, the apparatus being an embedded-system device, comprising:

a memory; and at least one processor coupled to the memory and configured to:

receive first command or data through a first serial port of the embedded-system device;

expose a second serial port to a host of the embedded-system device such that the host has control over the second serial port and receive second command or data from the host for outputting at the second serial port;

redirect the first command or data to the second serial port when the embedded-system device is in a first mode; and allow the second command or data to be output at the second serial port when the embedded-system device is in a second mode;

wherein to redirect the first command or data, the at least one processor is further configured to, in the first mode:

construct third command or data based on the first command or data; and send the third command or data to the second serial port for outputting.

8. The apparatus of claim 7, wherein the at least one processor is further configured to:

connect with the host to become a super IO controller of the host, wherein the second serial port is exposed to the host as a serial port of the super IO controller.

9. The apparatus of claim 7, wherein the at least one processor is further configured to:

receive first signals at the first serial port;

operate a first serial port controller to process the first signals to generate the first command or data;

send the third command or data to a second serial port controller;

generate, at the second serial port controller, second signals based on the third command or data; and output the second signals at the second serial port.

10. The apparatus of claim 7, wherein the at least one processor is further configured to, in the first mode:

configure a chip of the embedded-system device to open a communication channel between the first serial port with the second serial port, wherein the chip transfers, through the communication channel, the first command or data received at the first serial port to the second serial port without being processed by firmware of the embedded-system device.

11. The apparatus of claim 7, wherein the at least one processor is further configured to:

receive a control command that includes an indication of the first mode or the second mode; and set the embedded-system device to operate in the first mode or the second mode according to the control command.

12. The apparatus of claim 11, wherein the control command in an Intelligent Platform Management Interface (IPMI) command.

13. A non-transitory computer-readable medium storing computer executable code for operating an embedded-system device, comprising code to:

receive first command or data through a first serial port of the embedded-system device;

expose a second serial port to a host of the embedded-system device such that the host has control over the second serial port and receive second command or data from the host for outputting at the second serial port;

redirect the first command or data to the second serial port when the embedded-system device is in a first mode; and allow the second command or data to be output at the second serial port when the embedded-system device is in a second mode;

wherein to redirect the first command or data, the code is further configured to, in the first mode:

construct third command or data based on the first command or data; and send the third command or data to the second serial port for outputting.

14. The non-transitory computer-readable medium of claim 13, wherein the code is further configured to:

connect with the host to become a super IO controller of the host, wherein the second serial port is exposed to the host as a serial port of the super IO controller.

15. The non-transitory computer-readable medium of claim 13, wherein the code is further configured to:
receive first signals at the first serial port;
operate a first serial port controller to process the first signals to generate the first command or data;
send the third command or data to a second serial port controller;
generate, at the second serial port controller, second signals based on the third command or data; and
output the second signals at the second serial port.

16. The non-transitory computer-readable medium of claim 13, wherein the code is further configured to, in the first mode:
configure a chip of the embedded-system device to open a communication channel between the first serial port with the second serial port, wherein the chip transfers, through the communication channel, the first command or data received at the first serial port to the second serial port without being processed by firmware of the embedded-system device.

17. The non-transitory computer-readable medium of claim 13, wherein the code is further configured to:
receive a control command that includes an indication of the first mode or the second mode; and
set the embedded-system device to operate in the first mode or the second mode according to the control command.

* * * * *